(12) United States Patent
Valencia et al.

(10) Patent No.: US 9,276,680 B2
(45) Date of Patent: Mar. 1, 2016

(54) ADAPTIVE SAMPLING QUALIFICATION FOR EXTINCTION RATIO CONTROL

(71) Applicant: Maxim Integrated Products, Inc., San Jose, CA (US)

(72) Inventors: Miguel Valencia, Bristol (GB);
Benjamin A. Willcocks, Bristol (GB);
Christopher J. Born, Bristol (GB)

(73) Assignee: Maxim Integrated Products, Inc., San Jose, CA (US)

( * ) Notice: Subject to any disclaimer, the term of this patent is extended or adjusted under 35 U.S.C. 154(b) by 173 days.

(21) Appl. No.: 13/930,802

(22) Filed: Jun. 28, 2013

(65) Prior Publication Data

US 2014/0270806 A1 Sep. 18, 2014

Related U.S. Application Data

(60) Provisional application No. 61/781,526, filed on Mar. 14, 2013.

(51) Int. Cl.
*H04B 10/50* (2013.01)
*H04B 10/08* (2006.01)
*H04B 10/564* (2013.01)

(52) U.S. Cl.
CPC ............ *H04B 10/564* (2013.01); *H04B 10/504* (2013.01)

(58) Field of Classification Search
CPC ............................. H04B 10/564; H04B 10/504
USPC .................................................. 398/182, 183
See application file for complete search history.

(56) References Cited

U.S. PATENT DOCUMENTS

| | | | |
|---|---|---|---|
| 4,733,398 A * | 3/1988 | Shibagaki et al. | 372/31 |
| 5,043,745 A * | 8/1991 | Inoue et al. | 347/246 |
| 6,661,817 B1 * | 12/2003 | Ames et al. | 372/29.021 |
| 6,862,379 B2 * | 3/2005 | Howley | 385/14 |
| 7,492,797 B2 * | 2/2009 | Uesaka | 372/38.01 |
| 2001/0038586 A1 * | 11/2001 | Gushima et al. | 369/47.35 |
| 2005/0068882 A1 * | 3/2005 | Yamamuro | 369/116 |
| 2012/0051379 A1 * | 3/2012 | Wang et al. | 372/38.01 |
| 2012/0106953 A1 * | 5/2012 | Nguyen et al. | 398/38 |
| 2014/0270806 A1 * | 9/2014 | Valencia et al. | 398/182 |

OTHER PUBLICATIONS

Operational Amplifier Circuits; Chaniotakis and Cory; Spring 2006; 6.071; pp. 1-26.

* cited by examiner

*Primary Examiner* — Oommen Jacob
(74) *Attorney, Agent, or Firm* — Advent, LLP

(57) ABSTRACT

Techniques are described for adaptive sampling qualification for extinction ration control. The techniques may be implemented in a laser driver assembly which includes a laser driver and a sampling loop configured to facilitate sampling of photodiode current produced by a monitor photodiode (MPD) of an optical transmitter assembly. The sampling loop comprises a low pass filter with reset, a digital-to-analog converter (DAC), and a comparator. The filter receives transmit (Tx) data provided to the laser driver and generates an output corresponding to a number of consecutive bits of a first type received in the transmit (Tx) data. The filter resets the output when a bit of a second type is received. The digital-to-analog converter (DAC) outputs a threshold signal. The comparator compares the output from the low pass filter and the threshold signal, and outputs a signal indicating when the photodiode current is to be sampled.

21 Claims, 5 Drawing Sheets

US 9,276,680 B2

ADAPTIVE SAMPLING QUALIFICATION FOR EXTINCTION RATIO CONTROL

CROSS-REFERENCE TO RELATED APPLICATIONS

This application claims priority to U.S. Provisional Application No. 61/781,526 filed on Mar. 14, 2013, entitled: "Adaptive Sampling Qualification for Extinction Ratio Control," which is hereby incorporated by reference in its entirety.

BACKGROUND

Optical transmitters employ laser drivers to drive solid state laser diodes for optical transmission of data over fiber optic lines. These devices are capable of high data rates and, accordingly, are finding ever increasing application in data communications. Solid state lasers, however, have various characteristics that must be accounted for in such applications. One such characteristic is that, at least for high data rates, solid state lasers are not operated between on and off conditions because of the time it takes for the laser, when fully off, to get back into a lasing condition. Accordingly, for high data rates, such lasers are commonly operated between a high optical power level as one data state and a much lower power level for the second data state. For purposes of discussion herein, it is assumed that the high optical power level will represent a logic "1" and the low optical power level will represent a logic "0." The ratio of optical power levels, $P_1$ for the high optical power level and $P_0$ for the low optical power level, is referred to as the extinction ratio ($P_1/P_0$). Normally, the user of the laser driver, i.e., the manufacturer of the optical transmitter, desires to set and control the extinction ratio and the average power. Optical transmitters also typically include a monitor photodiode (MPD) which receives a part of the light emitted by the transmitting laser diode to provide a measure of the optical power levels of the transmitting laser diode. However, such monitor diodes and their associated circuitry do not have the high frequency capabilities of the transmitting diode and, accordingly, have real limitations with respect to what the monitor diode can accomplish.

SUMMARY

Techniques are described for adaptive sampling qualification for extinction ratio control. In one or more embodiments, the techniques may be implemented in a laser driver assembly that includes a laser driver and a sampling loop configured to facilitate sampling of photodiode current produced by a monitor photodiode (MPD) of an optical transmitter assembly. The sampling loop comprises a low pass filter with reset, a digital-to-analog converter (DAC), and a comparator. The filter is configured to receive transmit (Tx) data provided to the laser driver and to generate an output corresponding to a number of consecutive bits of a first type received in the transmit (Tx) data. The filter is also configured to reset the output when a bit of a second type is received. The digital-to-analog converter (DAC) is configured to output a threshold signal. The comparator configured to compare the output from the low pass filter and the threshold signal, and to output a signal indicating when the photodiode current is to be sampled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

The variation of the characteristics of solid state laser diodes due to temperature, more specifically threshold and slope efficiency of the laser diodes, are well-known; such characteristics are very difficult, if not impossible, to predict. This is because the variation in the laser diode characteristics is caused by a combination of factors such as variation of the electron-mobility, defects of the crystal structure of the laser, variation of the reflectivity of the mirror of the laser, and so forth. Moreover, the threshold and efficiency of the laser diodes varies over time due to the deterioration of the laser.

Figure 1:
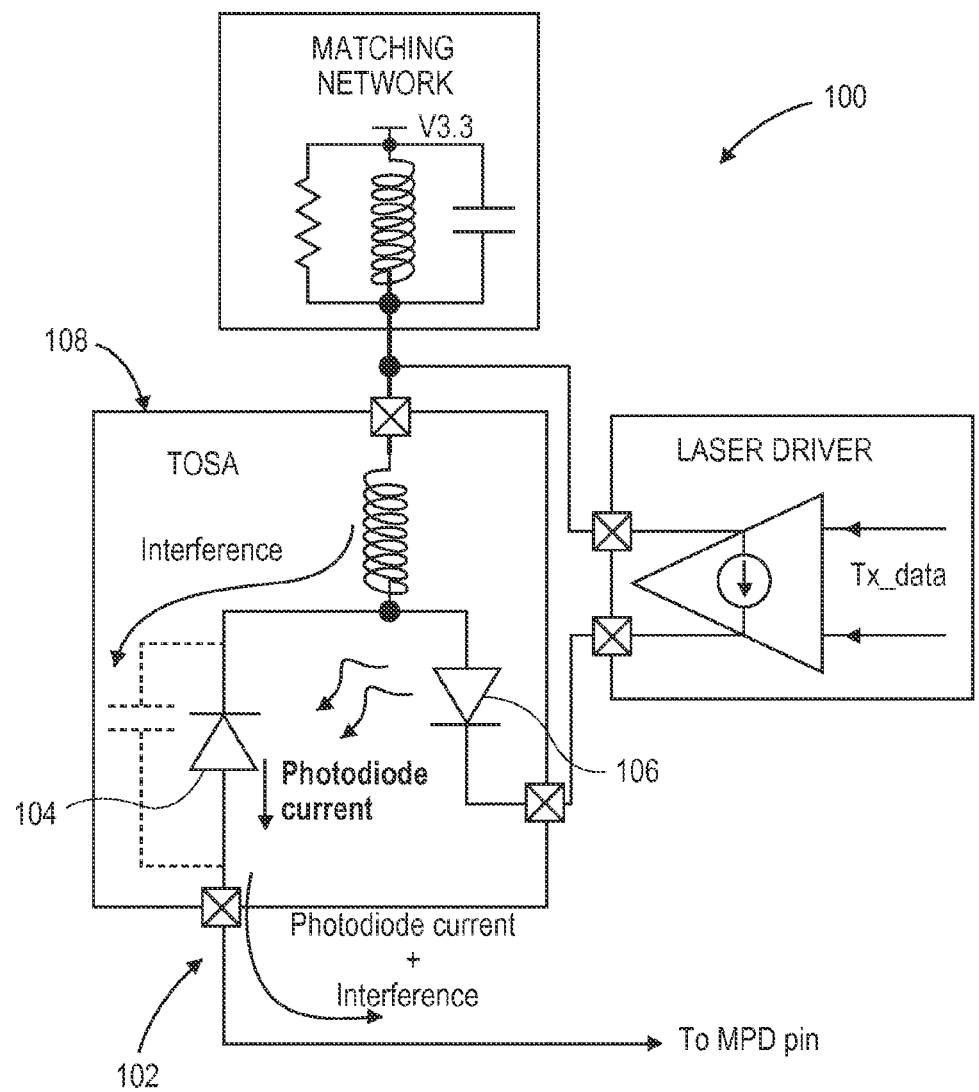
FIG. 1 is a block diagram illustrating an optical transmitter assembly in accordance with an example embodiment of the present disclosure.

The traditional approach to mitigate variation in solid state laser diode characteristics such as threshold and slope efficiency is to use an average power control (APC) loop conjunction with a look-up table (LUT). FIG. 1 illustrates an optical transmitter assembly 100 that employs an APC loop 102 in accordance with an example embodiment of the present disclosure. The APC loop 102 uses a monitor photodiode (MPD) 104 that is located in close proximity to the laser diode 106 (forming a Transmit Optical Sub-Assembly (TOSA) 108, as shown, or a Bi-Directional Optical Sub-Assembly (BOSA)). The photodiode 104 produces a current (photodiode current) proportional to the average power transmitted by the laser diode 106. The photodiode current is provided by the MPD pin 110 and is used to compensate one of the parameters, e.g., the threshold. The variation of the other parameter, e.g., slope efficiency, is corrected by using the look up table (LUT). Creating look up tables (LUTs) is, in general, an undesirable process in production since sweeping of the temperature is employed to produce an accurate result. Moreover, lookup tables (LUTs) can be inaccurate, since the signals recorded in the look up table (LUT) are static, and they cannot compensate variation due to the aging of the laser diode 106.

Existing optical transmitter assemblies have been developed that continuously compensate for the variation of threshold and slope efficiency. Most of these assemblies exploit the photodiode 104 that is used in the APC loop 102 to extract the information needed. There are two main difficulties in this approach. First, the bandwidth of the photodiode is limited since the photodiode is designed to be used in APC loop applications. Second, in order to reduce the number of pins presented in the TOSA 108 package, laser manufacturers typically connect the anode of the laser diode 106 to the cathode of the photodiode 104.

Figure 2:
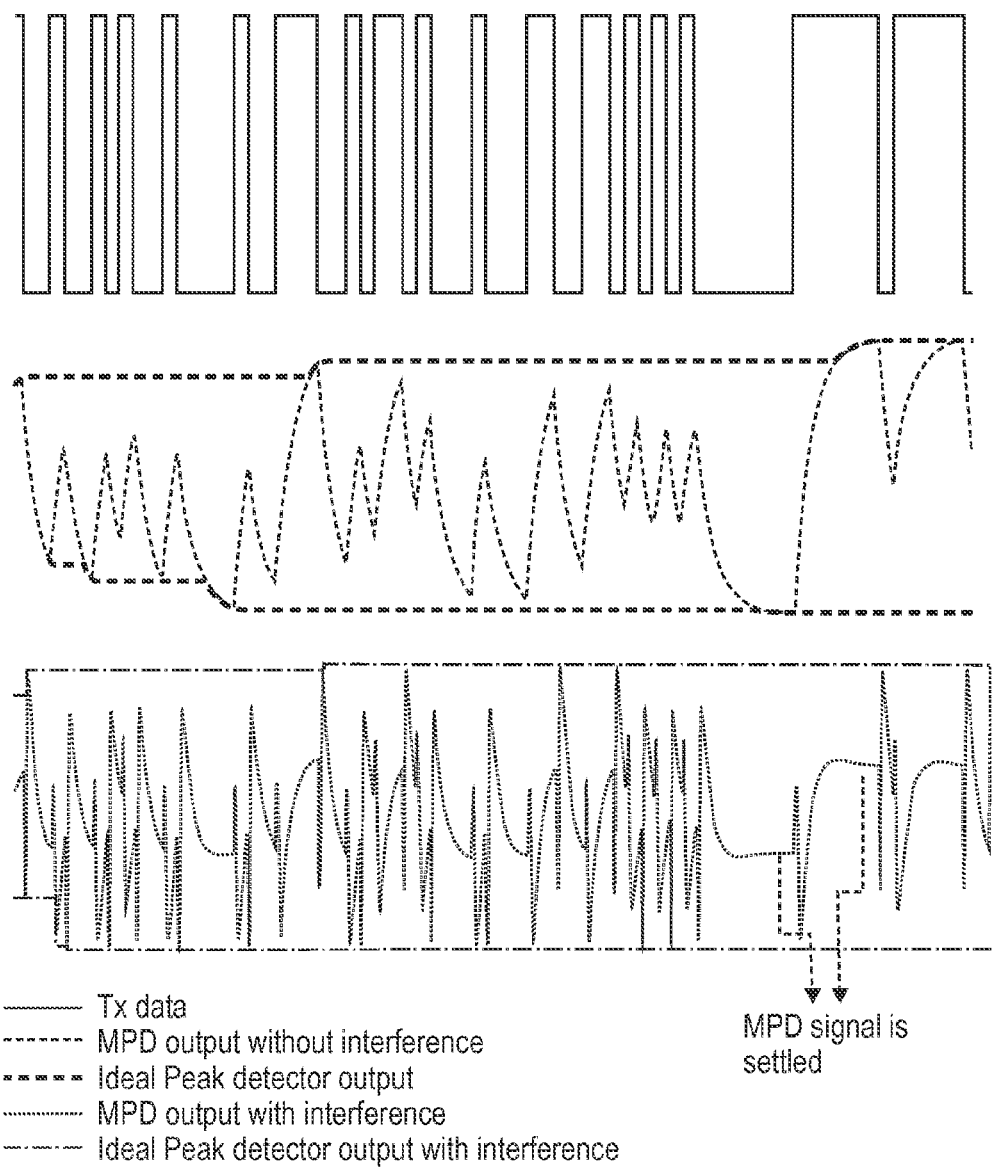
FIG. 2 is a diagrammatic illustration depicting the output of peak detectors coupled with the optical transmitter shown in FIG. 1, wherein the output is depicted for given transmit (Tx) data, with and without interference.

Optical transmitter assemblies have been developed that employ a peak-detector to overcome the difficulties caused by the limited bandwidth of the photodiode. For example, in one implementation, two peak detectors are used to hold the peaks of the amplitude of the heavily filtered signal from the photodiode 104. FIG. 2 illustrates the output of the two peak detectors (a peak detector and a trough detector) coupled with the optical transmitter assembly 100 shown in FIG. 1, wherein the output is depicted for given transmit (Tx) data, with and without interference. As shown, the output of the peak detectors (the peak detector and the trough detector) are directly proportional to the optical power transmitted by the laser diode 106 for the low frequency Tx data, e.g., several 0's and 1's. However, the signal from the photodiode 104, which is coupled though the common MPD pin of the optical transmitter assembly 100, can be larger in amplitude due to interference than the signal without interference. In embodiments, the ideal peak detector follows the peak of the interference which is not proportional to the transmitted optical power but the electrical current inserted into the laser. However, the peak detector is not ideal and will have a finite bandwidth during the attack period and, at the same time, will also have a specific decay time. These two factors contribute to limit the capability of the peak detector to track the interface, but will still affect the measurement.

The interference is coupled in every transition of the data but it settles after several consecutive bits. Moreover, as the number of consecutive bits transmitted increases, the interference becomes increasingly settled. Thus, photodiode current can be sampled at this time.

Accordingly, techniques are described to create a signal that allows sampling of the photodiode current as late as possible in each run of consecutive bits of the same type. In one or more embodiments, the techniques may be implemented in a laser driver assembly that includes a laser driver and a sampling loop configured to facilitate sampling of photodiode current produced by a monitor photodiode (MPD) of an optical transmitter assembly. The sampling loop comprises a low pass filter with reset, a digital-to-analog converter (DAC), and a comparator. The filter is configured to receive transmit (Tx) data provided to the laser driver and to generate an output corresponding to a number of consecutive bits of a first type received in the transmit (Tx) data. The filter is further configured to reset the output when a bit of a second type is received. The digital-to-analog converter (DAC) is configured to output a threshold signal. The comparator is configured to compare the output from the low pass filter and the threshold signal, and to output a signal indicating when the photodiode current is to be sampled.

The techniques are adaptive and can detect, statistically, the longest runs of data. Thus, the techniques do not require counting number of transmitted bits, which requires very tight control of timers.

Example Implementations

Figure 3:
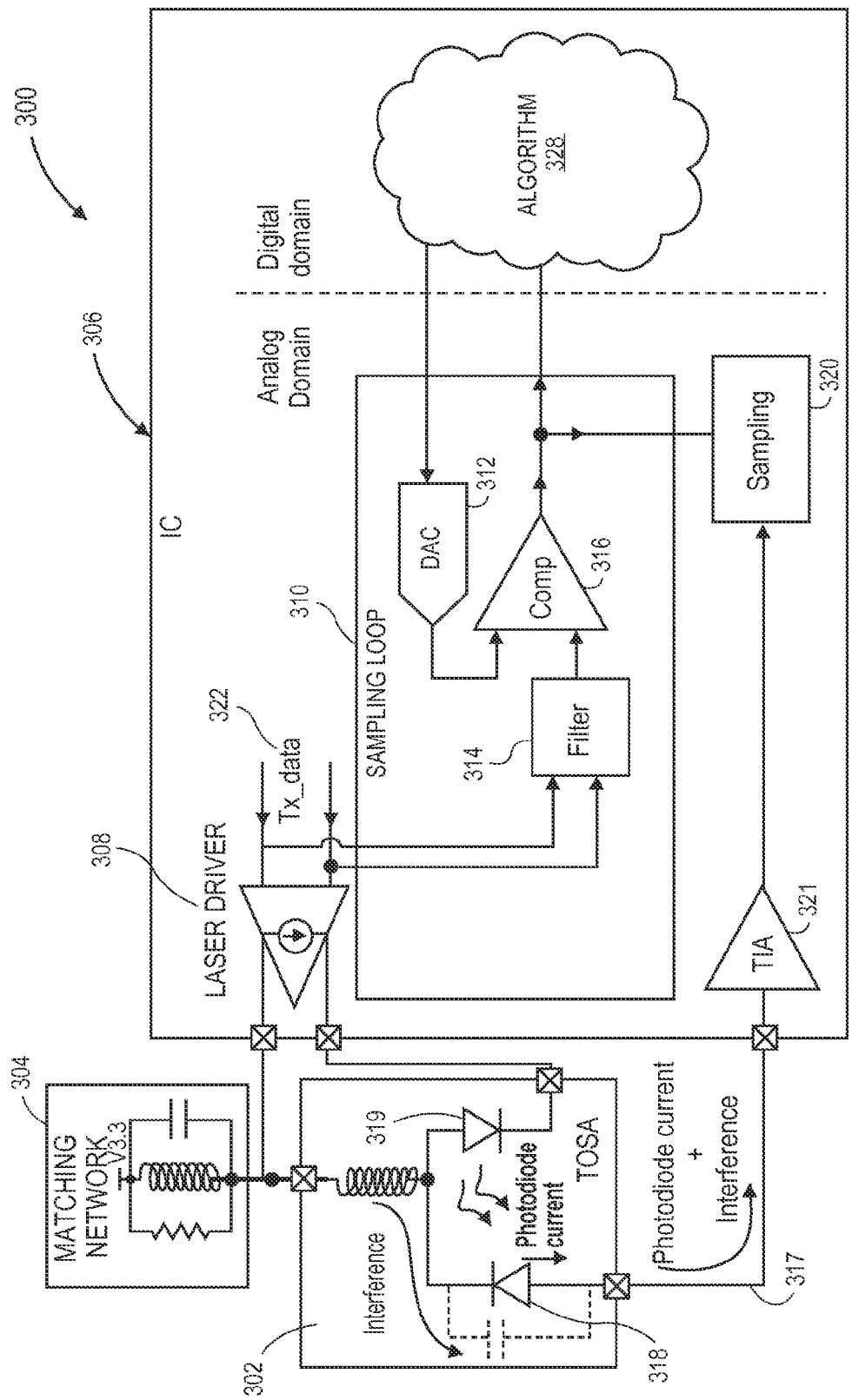
FIG. 3 is a block diagram illustrating an optical transmitter assembly configured to furnish adaptive sampling qualification for extinction ratio control in accordance with an example implementation of the present disclosure.

FIG. 3 illustrates an optical transmitter assembly 300 configured to furnish adaptive sampling qualification for extinction ratio control in accordance with an example implementation of the present disclosure. As shown, the optical transmitter assembly 300 includes a Transmit Optical Sub-Assembly (TOSA) 302 (or a Bi-Directional Optical Sub-Assembly (BOSA)), a matching network 304, and a laser driver assembly 306 (which may be implemented as an integrated circuit). The laser driver assembly 306 includes a laser driver 308 and a sampling loop 310. In embodiments, the sampling loop 310 includes a digital-to-analog converter (DAC) 312, a low pass filter with reset 314, and a comparator 316.

The filter 314 is configured to receive transmit (Tx) data 322 provided to the laser driver 308 and to generate an output corresponding to a number of consecutive bits of a first type (e.g., "0s" or "1s") received in the transmit (Tx) data 322. The filter 314 is further configured to reset the output when a bit of a second type (e.g., a "1" or a "0") is received. The filter 314 is driven with the transmit (Tx) data 322, and not by the photodiode current 317 (current produced by the monitor photodiode (MPD) 318 in response to the laser diode 319). Thus, the bandwidth of the filter 314 does not depend on the capacitance of the photodiode 318. In embodiments, when the sampling loop 310 is configured to detect the sampling point for transmitted "1s" in the transmitted (Tx) data 322, the filter 314 is reset when a "0" is transmitted. Similarly, when sampling loop 310 is detecting the sampling point for transmitted "0s" in the transmitted (Tx) data 322, the filter 314 is reset when a "1" is transmitted.

The digital-to-analog converter (DAC) 312 is configured to output a threshold signal. As shown, the digital-to-analog converter (DAC) 312 is controlled in a close loop based on the information furnished by the comparator 316. The signal output by the digital-to-analog converter (DAC) 312 is chosen to maintain a determined ratio of the output of the comparator 316. The ratio can be changed depending on the transmitted (Tx) data 322 to exploit different characteristics of the data pattern transmitted. For example, if the transmitted (Tx) data 322 is scrambled with pseudorandom binary sequence 7 (PRBS7), a suitable point to sample the current of the photodiode 318 happens when seven (7) consecutive bits (or more) are transmitted (e.g., seven (7) consecutive "1s" or seven (7) consecutive "0s"). This event may be detected by setting the ratio to "1/31," since PRBS7 has thirty-two (32) transitions and only one place where there are seven (7) consecutive bits. The output of the comparator 316 may thus, on average, produce thirty-one (31) "0" and one (1) "1." Thus, the digital-to-analog converter (DAC) 312 output may change to maintain a specific duty cycle of the comparator's output.

Figure 4:
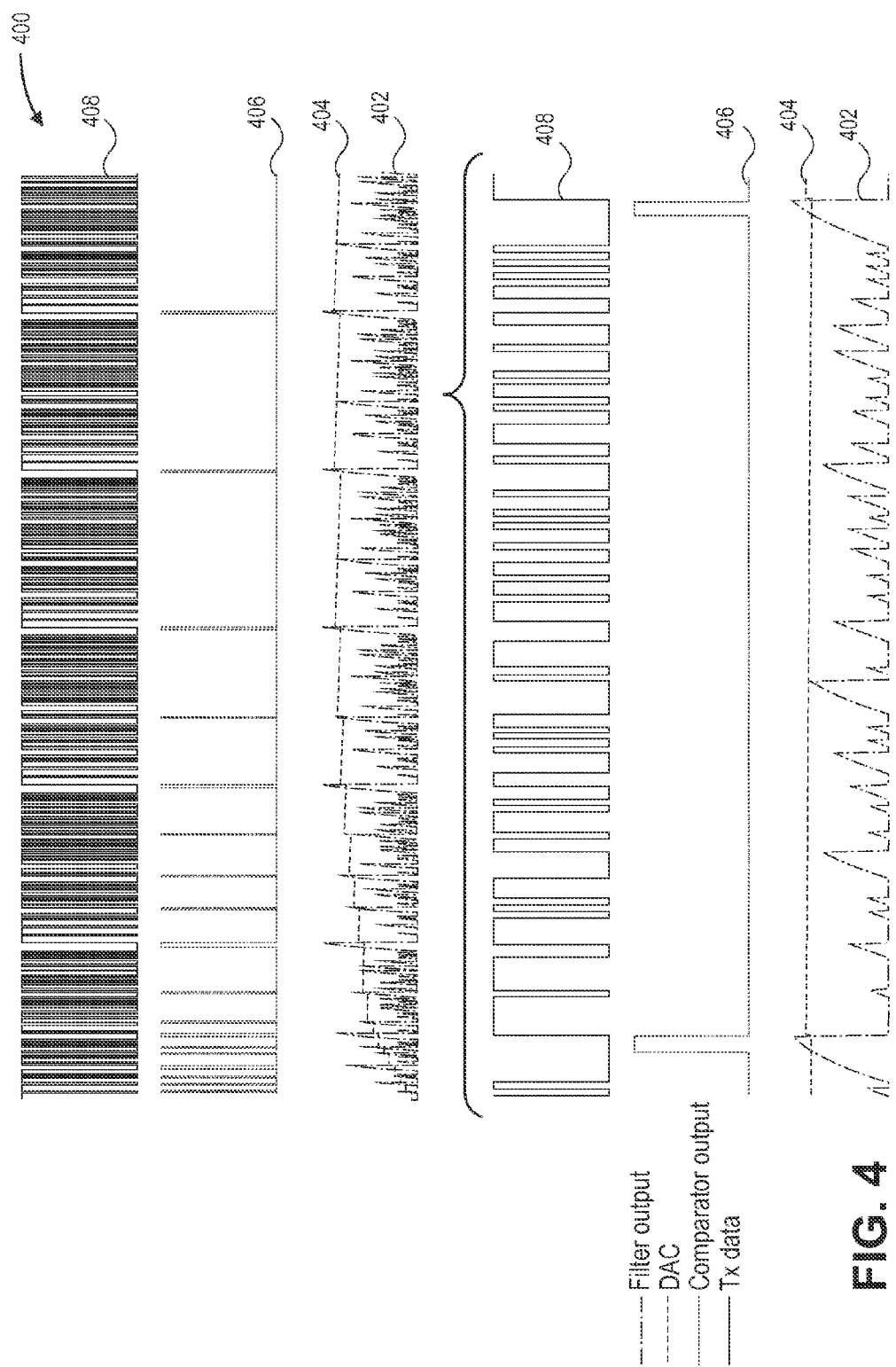
FIG. 4 is a diagrammatic illustration depicting the outputs of the filter, DAC, and comparator of the optical transmitter assembly shown in FIG. 3, wherein the outputs are depicted for given transmit (Tx) data.

The comparator 316 is configured to compare the output from the low pass filter 314 and the threshold signal output by the digital-to-analog (DAC) 312. The comparator 316 outputs a signal indicating when the photodiode current 317 is to be sampled. FIG. 4 depicts the outputs 400 of the filter 314, the digital-to-analog converter (DAC) 312, and the comparator 316 of the optical transmitter assembly 300 shown in FIG. 3 (outputs 402, 404, 406, respectively), wherein the outputs are depicted for given transmit (Tx) data 408. As shown, when the sampling loop 310 is settled (e.g., when seven (7) consecutive bits (e.g., seven (7) consecutive "1s" or seven (7) consecutive "0s") are transmitted), the comparator 316 produces a signal (e.g., the comparator 316 signal changes state) that indicates a suitable time for sampling of the current 317 of the photodiode 318 (via sampling module 320 (and after translation by a transimpedance amplifier (TIA) 322) FIG. 3).

In one or more embodiments, time multiplexing may be employed with the sampling loop 310 (including the digital-to-analog converter (DAC) 312, the low pass filter with reset 314, and the comparator 316) to detect the sampling point for both "0s" and "1s." In other embodiments, the laser driver assembly 306 can comprise a second sampling loop including a second digital-to-analog converter (DAC), a second low pass filter with reset, and a second comparator to simultaneously detect the sampling point for "0s" and "1s". Operation of the sampling loop 310 is controlled by an algorithm 328 in the digital domain of the optical transmitter assembly 300.

Figure 5:
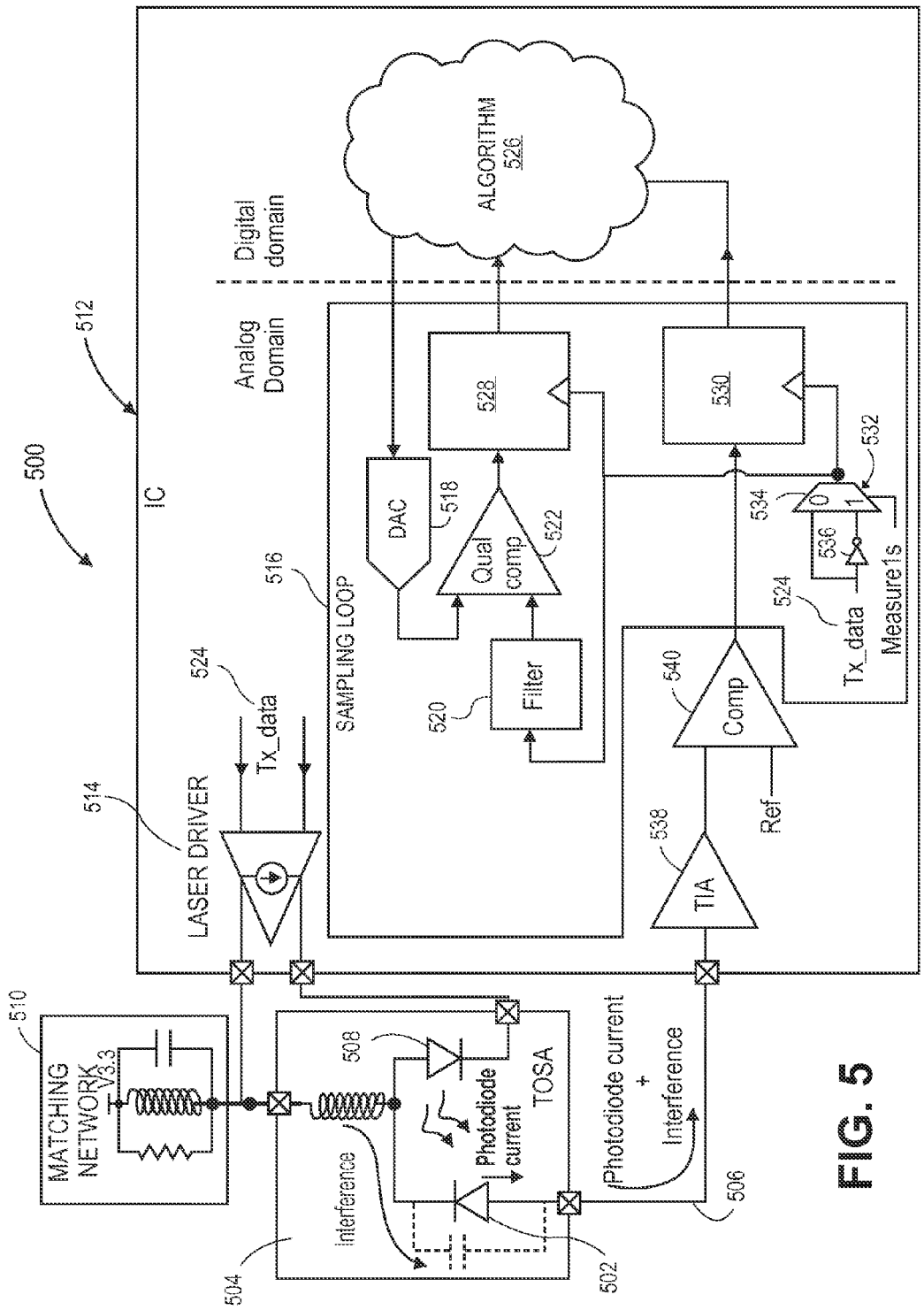
FIG. 5 is a block diagram illustrating an optical transmitter assembly configured to furnish adaptive sampling qualification of the current of the photodiode of the transmit optical sub-assembly (TOSA) of the optical transmitter assembly in accordance with an example implementation of the present disclosure.

FIG. 5 illustrates an optical transmitter assembly 500 configured to furnish adaptive sampling qualification of the current of the monitor photodiode (MPD) 502 of the Transmit Optical Sub-assembly (TOSA) 504 (or a Bi-Directional Optical Sub-Assembly (BOSA)) in accordance with an example embodiment of the present disclosure. In this manner, techniques are furnished to simplify the sampling of the photodiode current 506 (the current produced by the photodiode 502 in response to laser diode 508).

As shown, the optical transmitter assembly 500 includes the TOSA 504, a matching network 510, and a laser driver assembly 512 (which may be implemented as an integrated circuit). The laser driver assembly 512 includes a laser driver 514 and a sampling loop 516. In embodiments, the sampling loop 516 includes a digital-to-analog converter (DAC) 518, a low pass filter with reset 520, and a comparator (Qual Comp) 522.

The filter 520 is configured to receive transmit (Tx) data 524 provided to the laser driver 514 and to generate an output corresponding to a number of consecutive bits of a first type (e.g., "0s" or "1s") received in the transmit (Tx) data 524. The filter 520 is further configured to reset the output when a bit of a second type (e.g., a "1" or a "0") is received. The filter 520 is driven with the transmitted (Tx) data 524, and not by the photodiode current 506. Thus, the bandwidth of the filter 520 does not depend on the capacitance of the photodiode 502 of the TOSA 504. In embodiments, when the sampling loop 516 is detecting the sampling point for transmitted "1s" in the transmitted (Tx) data 524, the filter 520 is reset when a "0" is transmitted. Similarly, when sampling loop 516 is detecting the sampling point for transmitted "0s" in the transmitted (Tx) data 524, the filter 520 is reset when a "1" is transmitted.

The digital-to-analog converter (DAC) 518 is configured to output a threshold signal. The digital-to-analog converter (DAC) 518 is controlled in a closed loop based on the information furnished by the comparator 522. The signal output by the digital-to-analog converter (DAC) 518 is chosen to maintain a determined duty cycle of the output of the comparator 522. The duty cycle can be changed depending on the transmitted (Tx) data 524 to exploit different characteristics of the data pattern transmitted. For example, if the transmitted (Tx) data 524 is scrambled with pseudorandom binary sequence 7 (PRBS7), a suitable point to sample the current of the photodiode 502 happens when seven (7) consecutive bits (or more) are transmitted (e.g., seven (7) consecutive "1s" or seven (7) consecutive "0s"). This event may be detected by setting the duty cycle (ratio) to "1/31," since PRBS7 has thirty-two (32) transitions and only one place where there are seven (7) consecutive bits. The output of the comparator 522 may thus, on average, produce thirty-one (31) "0" and one (1) "1."

The comparator 522 is configured to compare the output from the low pass filter 520 and the threshold signal output by the digital-to-analog (DAC) 518. The comparator 522 outputs a signal indicating when the photodiode current is to be sampled.

As shown in FIG. 5, the sampling loop 516 further includes latches 528, 530. The latches 528, 530 are configured to sample the photodiode current 506 and the previous output of the comparator (Qual Comp) 522 with the transmit (Tx) data 524. When the sampling loop 516 is configured to measure "0s," the latch occurs in the rising edge of the transmit Tx data 524. Conversely, when the sampling loop 516 is configured to measure "1s," the latch occurs in the falling edge of the transmit Tx data 524. Thus, the latches 528, 530 sample the photodiode current 506 (MPD pin) and comparator (Qual Comp) 522 in respective (every) transitions of the transmit (Tx) data 524. However, as discussed above, the information from the photodiode 502 (the photodiode current 506) is used when the longest run of consecutive bits (e.g., seven (7) consecutive "1s" or seven (7) consecutive "0s") is detected. In embodiments, the photodiode current 506 may be sampled following translation by a transimpedance amplifier (TIA) 538, and may be compared with a reference ("Ref") by a comparator 540. Accordingly, the digital core (algorithm 526) masks the output of the MPD latch 530 with the output of the Qual latch 528 (the output of the Qual latch 530 is "1" when the longest run is detected).

In embodiments, the sampling loop 516 employs an inversion circuit 532 that is configured to invert the input (transmit (Tx) data 524) provided to the filter 516 and as a clock to the latches 528, 530 to configure the sampling loop 516 to measure "0s" or "1s" as discussed above. For example, in embodiments, the sampling loop 310 may be configured to detect the sampling point for transmitted "1s" in the transmitted (Tx) data 524. Thus, the filter 516 is reset when a "0" is transmitted. The sampling loop 516 may be configured to detect a sampling point for transmitted "0s" in the transmit (Tx) data 524, so that the filter 516 is reset when a "1" is transmitted, by inverting the transmit (Tx) data 524. As shown in FIG. 5, the inversion circuit 532 may employ a multiplexor 534 and an inverter 536 configured to output either transmit (Tx) data 524 or transmit (Tx) data 524 that is inverted depending on the state of the "Measure 1s" signal.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A laser driver assembly comprising:
    a laser driver; and
    a sampling loop configured to facilitate sampling of photodiode current produced by a monitor photodiode (MPD) of an optical transmitter assembly, the sampling loop comprising:
    a low pass filter configured to receive transmit (Tx) data provided to the laser driver and to generate an attenuated output waveform corresponding to an input waveform defined by a number of consecutive bits of a first type received in the transmit (Tx) data, the low pass filter configured to reset the output waveform when a bit of a second type is received;
    a digital-to-analog converter (DAC) configured to output a threshold signal; and
    a comparator configured to compare the output waveform from the low pass filter and the threshold signal, and to output a signal indicating when the photodiode current is to be sampled.

2. The laser driver assembly as recited in claim 1, wherein when the sampling loop is configured to detect the sampling point for bits of the first type in the transmit (Tx) data, the low pass filter is reset when a bit of a second type is transmitted.

3. The laser driver assembly as recited in claim 2, wherein the respective bits of the first type comprise a 1, and wherein the bit of the second type comprises a 0.

4. The laser driver assembly as recited in claim 2, wherein the respective bits of the first type comprise a 0, and wherein the bit of the second type comprises a 1.

5. The laser driver assembly as recited in claim 1, wherein the threshold signal output by the digital-to-analog converter (DAC) is selected to maintain a predetermined ratio of the output of the comparator.

6. The laser driver assembly as recited in claim 1, wherein a comparator is configured to output the signal when the output waveform from the low pass filter is greater than the threshold signal.

7. The laser driver assembly as recited in claim 1, further comprises one or more latches, the one or more latches configured to sample the photodiode current and the output of the comparator.

8. An optical transmitter assembly comprising:
   a transmit optical sub-assembly (TOSA) including a laser and a monitor photodiode (MPD); and
   a laser driver assembly, comprising:
   a laser driver; and
   a sampling loop configured to facilitate sampling of photodiode current produced by the monitor photodiode (MPD), the sampling loop comprising:
   a low pass filter configured to receive transmit (Tx) data provided to the laser driver and to generate an attenuated output waveform corresponding to an input waveform defined by a number of consecutive bits of a first type received in the transmit (Tx) data, the low pass filter configured to reset the output waveform when a bit of a second type is received;
   a digital-to-analog converter (DAC) configured to output a threshold signal; and
   a comparator configured to compare the output waveform from the low pass filter and the threshold signal, and to output a signal indicating when the photodiode current is to be sampled.

9. The optical transmitter assembly as recited in claim 8, wherein when the sampling loop is configured to detect the sampling point for bits of the first type in the transmit (Tx) data, the low pass filter is reset when a bit of a second type is transmitted.

10. The optical transmitter assembly as recited in claim 9, wherein the respective bits of the first type comprise a 1, and wherein the bit of the second type comprises a 0.

11. The optical transmitter assembly as recited in claim 9, wherein the respective bits of the first type comprise a 0, and wherein the bit of the second type comprises a 1.

12. The optical transmitter assembly as recited in claim 8, wherein the threshold signal output by the digital-to-analog converter (DAC) is selected to maintain a predetermined ratio of the output of the comparator.

13. The optical transmitter assembly as recited in claim 8, wherein a comparator is configured to output the signal when the output waveform from the low pass filter is greater than the threshold signal.

14. The optical transmitter assembly as recited in claim 8, further comprises one or more latches, the one or more latches configured to sample the photodiode current and the output of the comparator.

15. A method to facilitate sampling of photodiode current produced by a monitor photodiode (MPD) of an optical transmitter assembly, the method comprising:
    receiving a transmit (Tx) data provided to a laser driver of the optical transmitter assembly;
    generate an attenuated output waveform corresponding to an input waveform defined by a number of consecutive bits of a first type received in the transmit (Tx) data,
    resetting the output waveform when a bit of a second type is received;
    generating a threshold signal;
    comparing the output waveform and the threshold signal; and
    outputting a signal indicating when the photodiode current is to be sampled.

16. The method as recited in claim 15, wherein when detecting the sampling point for bits of the first type in the transmit (Tx) data, resetting when a bit of a second type is transmitted.

17. The method as recited in claim 16, wherein the respective bits of the first type comprise a 1, and wherein the bit of the second type comprises a 0.

18. The method as recited in claim 16, wherein the respective bits of the first type comprise a 0, and wherein the bit of the second type comprises a 1.

19. The method as recited in claim 15, wherein the threshold signal is selected to maintain a predetermined ratio of the output of the comparator.

20. The method as recited in claim 15, wherein the signal is output when the output waveform from the low pass filter is greater than the threshold signal.

21. The method as recited in claim 15, further comprising sampling the photodiode current and the output of the comparator.

\* \* \* \* \*